United States Patent
Gerard

(10) Patent No.: US 10,040,934 B2
(45) Date of Patent: Aug. 7, 2018

(54) LIQUID (METH)ACRYLIC SYRUP FOR IMPREGNATING A FIBROUS SUBSTRATE AND METHOD FOR THE PRODUCTION THEREOF, METHOD FOR IMPREGNATING A FIBROUS SUBSTRATE, AND COMPOSITE MATERIAL PRODUCED AFTER POLYMERISATION OF SAID PRE-IMPREGNATED SUBSTRATE

(71) Applicant: Arkema France, Colombes (FR)

(72) Inventor: Pierre Gerard, Denguin (FR)

(73) Assignee: ARKEMA FRANCE, Colombes (FR)

( * ) Notice: Subject to any disclaimer, the term of this patent is extended or adjusted under 35 U.S.C. 154(b) by 185 days.

(21) Appl. No.: 14/772,847

(22) PCT Filed: Mar. 7, 2014

(86) PCT No.: PCT/FR2014/050531
§ 371 (c)(1),
(2) Date: Sep. 4, 2015

(87) PCT Pub. No.: WO2014/135815
PCT Pub. Date: Sep. 12, 2014

(65) Prior Publication Data
US 2016/0017138 A1  Jan. 21, 2016

(30) Foreign Application Priority Data

Mar. 8, 2013 (FR) .................................... 13 52077

(51) Int. Cl.
*C08L 53/00* (2006.01)
*C08J 5/24* (2006.01)
(Continued)

(52) U.S. Cl.
CPC .............. *C08L 53/00* (2013.01); *B29C 70/48* (2013.01); *C08J 5/24* (2013.01); *C08L 33/08* (2013.01);
(Continued)

(58) Field of Classification Search
CPC .................................................. C08F 2438/02
See application file for complete search history.

(56) References Cited

U.S. PATENT DOCUMENTS

| | | | |
|---|---|---|---|
| 4,287,317 A | 9/1981 | Kitagawa et al. | |
| 2009/0306301 A1* | 12/2009 | Guerret | B29C 39/006 525/267 |

(Continued)

FOREIGN PATENT DOCUMENTS

JP  2005048059 A  *  2/2005

OTHER PUBLICATIONS

Dorota Greszia and Krzysztof Matyjaszewski, Mechanism of Controlled/"Living" Radical Polymerization of Styrene in the Presence of Nitroxyl Radicals. Kinetics and Simulations, Macromolecules 1996, 29, 7661-7670.

(Continued)

*Primary Examiner* — Mark S Kaucher
(74) *Attorney, Agent, or Firm* — Thomas F. Roland

(57) ABSTRACT

The invention relates to a liquid (meth)acrylic syrup for impregnating a fibrous substrate. The invention especially relates to a viscous liquid syrup mainly containing methacrylic or acrylic components. The invention also relates to a method for producing such a syrup. The invention relates further to a process for impregnating a fibrous substrate or long fibers with said viscous liquid syrup. The invention also relates to a fibrous substrate preimpregnated with said syrup, which is useful for the production of mechanical or structured parts or products. The invention also relates to a (Continued)

production method for producing mechanical or structured parts or items and to three-dimensional mechanical or structured parts produced by said method. The invention applies to the production of mechanical parts or structural elements made of impact-resistant thermoplastic composite material.

31 Claims, 1 Drawing Sheet

(51) Int. Cl.
    *C08L 33/12*     (2006.01)
    *D06M 15/263*     (2006.01)
    *D06M 13/203*     (2006.01)
    *B29C 70/48*     (2006.01)
    *C08L 33/08*     (2006.01)
    *B29K 33/00*     (2006.01)
    *B29K 105/08*     (2006.01)

(52) U.S. Cl.
    CPC ........... *C08L 33/12* (2013.01); *D06M 13/203* (2013.01); *D06M 15/263* (2013.01); *B29K 2033/08* (2013.01); *B29K 2105/0809* (2013.01); *C08F 2438/02* (2013.01); *C08J 2333/12* (2013.01)

(56) References Cited

U.S. PATENT DOCUMENTS

| | | |
|---|---|---|
| 2011/0136995 A1* | 6/2011 | Nakagawa ............... B60C 1/00 526/126 |
| 2014/0256850 A1 | 9/2014 | Gerard et al. |
| 2015/0038650 A1 | 2/2015 | Bourrigaud et al. |
| 2015/0218362 A1 | 8/2015 | Gerard et al. |

OTHER PUBLICATIONS

David Griller and Keith U. Ingold, Persistent Carbon-Centered Radicals, Division of Chemistry, National Research Council of Canada, Ottawa, Canada KIA 0R9, vol. 9, 1976, pp. 13-19.
International Standard, ISO 179:1993(E), Plastics—Determination of Charpy Impact strength, Second edition May 15, 1993.
International Standard, ISO 13586, Plastics—Determination of fracture toughness (GLC and KLC)—Linear elastic fracture mechanics (LEFM0 approach, First Edition Mar. 1, 2000.
International Standard, ISO 11357-2, Plastics—Differential scanning calorimetry (DSC), Part 2: Determination of glass transition temperature and glass transition step height, second edition May 1, 2013.

* cited by examiner

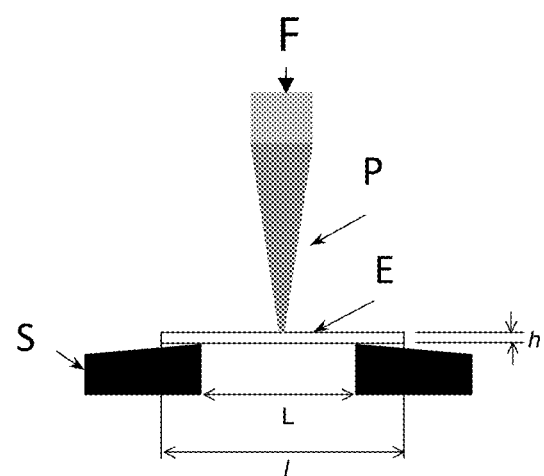

LIQUID (METH)ACRYLIC SYRUP FOR IMPREGNATING A FIBROUS SUBSTRATE AND METHOD FOR THE PRODUCTION THEREOF, METHOD FOR IMPREGNATING A FIBROUS SUBSTRATE, AND COMPOSITE MATERIAL PRODUCED AFTER POLYMERISATION OF SAID PRE-IMPREGNATED SUBSTRATE

This application claims benefit, under U.S.C. § 119 or § 365 of PCT Application Number PCT/FR2014/050531, filed Mar. 7, 2014; and French Application Number FR 13.52077, filed Mar. 8, 2013.

FIELD OF THE INVENTION

The present invention relates to a liquid (meth)acrylic syrup for impregnating a fibrous substrate.

More particularly, the invention relates to a viscous liquid (meth)acrylic syrup mainly containing methacrylic or acrylic components and an impact-modifying additive for reinforcing the impact strength of a thermoplastic material obtained after polymerization of the syrup. The invention also relates to a process for manufacturing such a syrup. The invention also relates to a process for impregnating a fibrous substrate or long fibers with said viscous liquid syrup. The invention also relates to a fibrous substrate preimpregnated with said syrup which is useful for manufacturing composite parts.

The present invention also relates to a process for manufacturing composite parts and to composite parts obtained via this process.

PRIOR ART

Mechanical parts that have to withstand high stresses during their use are widely manufactured from composite materials. A composite material is a macroscopic combination of two or more immiscible materials. The composite material consists of at least one material which forms the matrix, i.e. a continuous phase that ensures the cohesion of the structure, and a reinforcing material.

The purpose of using a composite material is to obtain performance qualities that are not available from each of its constituents when they are used separately. Consequently, composite materials are widely used in several industrial sectors, for instance building, automotive, aerospace, transport, leisure, electronics, and sport notably due to their better mechanical performance (higher tensile strength, higher tensile modulus, higher fracture toughness) and their low density, in comparison with homogeneous materials.

The most important class, in view of volume at the commercial industrial scale, is that of composites with organic matrices, in which the matrix material is generally a polymer. The matrix of a polymeric composite material is either a thermoplastic polymer or a thermosetting polymer.

Thermosetting polymers consist of crosslinked three-dimensional structures. The crosslinking is obtained by curing reactive groups in a prepolymer. Curing may be obtained, for example, by heating the polymer chains in order to crosslink and harden the material permanently. In order to prepare the polymeric composite material, the prepolymer is mixed with the other component, such as glass beads or fibers, or the other component is wetted or impregnated and cured afterwards. Examples of prepolymers or matrix material for thermosetting polymers are unsaturated polyesters, vinyl esters, and epoxy or phenolic materials.

A major drawback of a thermosetting polymer matrix is its crosslinking. The matrix cannot be easily fashioned into other forms. Once the polymer has crosslinked, the form is set. This also makes difficult the recycling of thermosetting composite material, and manufactured mechanical or structured parts or articles comprising said thermosetting composite material are burned in a cement plant or thrown into a waste dump. Another major drawback of all thermosetting matrices is their fragility.

To allow thermoforming and recycling, it is preferred to use thermoplastic polymers.

Thermoplastic polymers consist of linear or branched polymers, which are not crosslinked. The thermoplastic polymers are heated in order to mix the constituents necessary for manufacturing the composite material and are cooled to set the final form. The problem of these molten thermoplastic polymers is their very high viscosity. In order to prepare a polymeric composite material based on thermoplastic polymer, a thermoplastic polymer resin, commonly known as a "syrup", is used to impregnate the reinforcing material, for example a fibrous substrate. Once polymerized, the thermoplastic polymer syrup constitutes the matrix of the composite material. At the time of impregnation, the viscosity of the impregnation syrup must be controlled and adapted so as not to be too fluid or too viscous, so as to impregnate correctly each fiber of the fibrous substrate. When the wetting is partial, depending on whether the syrup is too fluid or too viscous, "naked" zones, i.e. non-impregnated zones, and zones in which drops of polymer form on the fibers, which are the cause of the creation of bubbles, respectively appear. These "naked" zones and these bubbles give rise to the appearance of defects in the final composite material, which are the cause, inter alia, of a loss of mechanical strength of the final composite material. A syrup that satisfies this problem was developed by the Applicant and is described in the as yet unpublished patent applications FR 1159553, or its PCT extension WO 2013/056845, and FR 1256929 or its PCT extension WO 2014/013028.

Thermoplastic polymers, especially amorphous thermoplastics such as PMMA (polymethyl methacrylate) and PS (polystyrene), for example, used for the preparation of composite materials nevertheless remain very fragile and do not have good mechanical properties, for instance impact strength. Although the fibrous substrate makes it possible to reinforce the mechanical properties of material by absorbing the energy due to an impact, since the matrix based on thermoplastic polymer is fragile, it cannot prevent the propagation of cracks, for example, and as such the final composite material still remains too fragile.

To improve the impact strength of a thermoplastic polymer, it is known practice to add, to the polymer in molten form, an impact additive, which modifies the impact strength, comprising an elastomeric phase. Such an additive is in the form of discrete multilayer spherical fine particles. This additive is also known as a core-shell additive since it has an elastomeric core, which is generally predominantly acrylic, and at least one thermoplastic envelope. The particles are prepared by emulsion polymerization and recovered in powder form by atomization. They generally comprise a succession of "hard" and "soft" layers. Two-layer (soft-hard) or three-layer (hard-soft-hard) particles may thus be found. In the specific case of PMMA, the particle size is generally less than 1 µm and more particularly between 100 nm and 500 nm.

This solution applied to the manufacture of composite materials comprising a thermoplastic matrix and a fibrous substrate cannot, however, be transposed to the industrial scale. Specifically, dispersing these weakly crosslinked discrete particles in the impregnation syrup to impregnate the fibrous reinforcement poses problems during the impregnation step. It was in point of fact found that beyond a certain content of particles in the syrup, of the order of 15% by weight, they swell and lead to the gelation of the syrup. The viscosity is then too high and it is no longer possible to impregnate the fibrous substrate without defects appearing. To avoid this gelation phenomenon, the content of these particles in the resin must be limited to a content of less than 15% by weight. However, such a content remains too low and does not afford the expected mechanical properties, especially as regards the impact strength and the resistance to abrasion.

Document EP 0019372 describes an impregnation syrup for fibrous substrates comprising an elastomeric polymer. The elastomeric polymer is in the form of particles in the syrup.

Technical Problem

The aim of the invention is thus to remedy at least one of the drawbacks of the prior art. The invention is especially directed toward proposing a part made of thermoplastic composite material which has improved mechanical properties, especially with a thermoplastic matrix having a rigidity of greater than 2 GPa, a resilience of greater than 50 kJ/m$^2$ and a crack strength of greater than 1.5 MPa·m$^{1/2}$.

The invention is also directed toward completely, correctly and uniformly wetting the fibrous substrate during the impregnation. Any defect in the wetting of the fibers, for example by the creation of bubbles and voids, reduces the mechanical performance of the final part made of composite material.

Another object of the present invention is to provide a process which can be performed at low cost and is capable of industrial-scale manufacture, for producing mechanical parts or structural elements made of thermoplastic composite material. In addition, the process should be easy and simple to perform using commercially available compounds. The manufacture of parts should also be reproducible and fast, meaning short cycle times.

BRIEF DESCRIPTION OF THE INVENTION

The Applicant has discovered, surprisingly, that a liquid (meth)acrylic syrup for impregnating a fibrous substrate, said fibrous substrate consisting of long fibers, said impregnation syrup being characterized in that it comprises:
 a) a (meth)acrylic polymer,
 b) a (meth)acrylic monomer,
 c) elastomeric domains consisting of macromolecular blocks of flexible nature, with a glass transition temperature of less than 0° C., and which are soluble in the (methacrylic) monomer, said liquid (meth)acrylic syrup having a dynamic viscosity of between 10 mPa·s and 10 000 mPa·s, preferably between 50 mPa·s and 5000 mPa·s and advantageously between 100 mPa·s and 1000 mPa·s, gives full and correct impregnation of the fibrous substrate and very good mechanical strength, especially impact strength, after polymerization.

The Applicant has also discovered, surprisingly, that an impregnation process for impregnating a fibrous substrate, said fibrous substrate consisting of long fibers and said process comprising a step of impregnating said fibrous substrate with said liquid (meth)acrylic impregnation syrup, gives full and correct impregnation of the fibrous substrate.

It has also been discovered, surprisingly, that a process for manufacturing such a liquid (meth)acrylic impregnation syrup, comprising the following steps:
 1. preparing macromolecular blocks by mixing with the monomer(s), intended to form the macromolecular blocks, an alkoxyamine of general formula Z(-T)$_n$ in which Z denotes a multivalent group, T a nitroxide and n is an integer greater than or equal to 2,
 2. mixing the macromolecular blocks obtained in step 1 with a (meth)acrylic polymer and a (meth)acrylic monomer,
makes it possible to significantly improve the mechanical properties of the thermoplastic matrix obtained after polymerization of the syrup.

It has also been discovered, surprisingly, that a process for manufacturing composite parts, comprising the following steps:
 a) impregnating a fibrous substrate with such a liquid (meth)acrylic syrup,
 b) polymerizing the liquid (meth)acrylic syrup impregnating said fibrous substrate,
makes it possible to obtain mechanical parts or structural elements that have significantly improved mechanical properties. These parts contain a thermoplastic matrix with a rigidity of greater than 2 GPa, a resilience of greater than 50 kJ/m$^2$ and a crack strength of greater than 1.5 MPa·m$^{1/2}$.

Moreover, it has also been discovered that a composite part obtained via the manufacturing process, from the thermoplastic matrix reinforced with elastomeric domains consisting of macromolecular blocks of flexible nature, with a glass transition temperature of less than 0° C., and which are soluble in the (meth)acrylic monomer, contains virtually no defects such as voids between the fibrous substrate and the (meth)acrylic polymer.

BRIEF DESCRIPTION OF THE DRAWINGS

FIG. 1 is a scheme of the flexure tests performed for Examples 1 and 2.

DETAILED DESCRIPTION

According to a first aspect, the present invention relates to a liquid (meth)acrylic syrup for impregnating a fibrous substrate, said fibrous substrate consisting of long fibers, said syrup being characterized in that it comprises:
 a) a (meth)acrylic polymer,
 b) a (meth)acrylic monomer,
 c) elastomeric domains consisting of macromolecular blocks of flexible nature, with a glass transition temperature of less than 0° C., and which are soluble in the (meth)acrylic monomer, said liquid (meth)acrylic syrup having a dynamic viscosity of between 10 mPa·s and 10 000 mPa·s, preferably between 50 mPa·s and 5000 mPa·s and advantageously between 100 mPa·s and 1000 mPa·s.

According to another aspect, the content of macromolecular blocks in the syrup is between 1% and 40% by weight, preferably between 2% and 25% by weight and advantageously between 5% and 15% by weight.

The term "fibrous substrate" as used refers to fabrics, felts or nonwovens that may be in the form of strips, laps, braids, locks or pieces.

The term "(meth)acrylic" as used refers to any type of acrylic or methacrylic monomer.

The term "PMMA" as used refers to homo- and copolymers of methyl methacrylate (MMA), the weight ratio of MMA in the PMMA being at least 70 wt % for the MMA copolymer.

The term "monomer" as used refers to a molecule which can undergo polymerization.

The term "polymerization" as used refers to the process of converting a monomer or a mixture of monomers into a polymer.

The term "thermoplastic polymer" as used refers to a polymer that turns to a liquid or becomes more liquid or less viscous when heated and that can take on new shapes by the application of heat and pressure.

The term "thermosetting polymer" as used refers to a prepolymer in a soft, solid or viscous state that changes irreversibly into an unmeltable, insoluble polymer network by curing.

The term "polymer composite" as used refers to a multicomponent material comprising several different phase domains, among which at least one type of phase domain is a continuous phase and in which at least one component is a polymer.

The term "miscibility" as used refers to the capacity of two compounds to mix together completely so as to form a homogeneous phase.

The term "solubility" as used refers to the capacity of a solid to mix in a liquid, known as a solvent, so as to form a solution having a homogeneous phase.

The term "rigidity" refers to a tensile test according to standard ISO 527 in the case of a thermoplastic or thermosetting material, optionally reinforced with fibers.

The term "resilience" refers to a non-notched Charpy impact test according to standard ISO 179 in the case of a material not reinforced with fibers.

The term "crack resistance" refers to a test on notched specimens according to standard ISO 13586 in the case of a material not reinforced with fibers.

As regards the composite part, it is a panel, a lid or a shell consisting of a composite material or of parts for aircraft, for boats (hull and bridge), railway vehicles (hatch, bulkhead, enclosure) and motor vehicle parts (bodywork, hood, door).

As regards the (meth)acrylic monomer, the monomer is chosen from acrylic acid, methacrylic acid, alkyl acrylic monomers, alkyl methacrylic monomers and mixtures thereof.

Preferably, the monomer is chosen from acrylic acid, methacrylic acid, alkyl acrylic monomers, alkyl methacrylic monomers and mixtures thereof, the alkyl group containing from 1 to 22 linear, branched or cyclic carbons; the alkyl group preferably containing from 1 to 12 linear, branched or cyclic carbons.

Advantageously, the (meth)acrylic monomer is chosen from methyl methacrylate, ethyl methacrylate, methyl acrylate, ethyl acrylate, methacrylic acid, acrylic acid, n-butyl acrylate, isobutyl acrylate, n-butyl methacrylate, isobutyl methacrylate, cyclohexyl acrylate, cyclohexyl methacrylate, isobornyl acrylate and isobornyl methacrylate, and mixtures thereof.

More advantageously, the (meth)acrylic monomer is chosen from methyl methacrylate, isobornyl acrylate and acrylic acid, and mixtures thereof.

According to a preferred embodiment, at least 50% by weight and preferably at least 60% by weight of the monomer is methyl methacrylate.

According to a more preferred embodiment, at least 50% by weight, preferably at least 60% by weight, more preferably at least 70% by weight, advantageously at least 80% by weight and even more advantageously 90% by weight of the monomer is a mixture of methyl methacrylate with isobornyl acrylate and/or acrylic acid.

As regards the (meth)acrylic polymer, mention may be made of polyalkyl methacrylates or polyalkyl acrylates. According to a preferred embodiment, the (meth)acrylic polymer is polymethyl methacrylate (PMMA).

The term "PMMA" denotes a methyl methacrylate (MMA) homopolymer or copolymer or mixtures thereof.

According to one embodiment, the methyl methacrylate (MMA) homo- or copolymer comprises at least 70%, preferably at least 80%, advantageously at least 90% and more advantageously at least 95% by weight of methyl methacrylate.

According to another embodiment, the PMMA is a mixture of at least one homopolymer and at least one copolymer of MMA, or a mixture of at least two homopolymers or two copolymers of MMA with a different average molecular weight, or a mixture of at least two copolymers of MMA with a different monomer composition.

The copolymer of methyl methacrylate (MMA) comprises from 70% to 99.7% by weight of methyl methacrylate and from 0.3% to 30% by weight of at least one monomer containing at least one ethylenic unsaturation that can copolymerize with methyl methacrylate.

These monomers are well known and mention may be made especially of acrylic and methacrylic acids and alkyl (meth)acrylates in which the alkyl group contains from 1 to 12 carbon atoms. As examples, mention may be made of methyl acrylate and ethyl, butyl or 2-ethylhexyl (meth)acrylate. Preferably, the comonomer is an alkyl acrylate in which the alkyl group contains from 1 to 4 carbon atoms.

According to a preferred embodiment, the copolymer of methyl methacrylate (MMA) comprises from 80% to 99.7%, advantageously from 90% to 99.7% and more advantageously from 90% to 99.5% by weight of methyl methacrylate and from 0.3% to 20%, advantageously from 0.3% to 10% and more advantageously from 0.5% to 10% by weight of at least one monomer containing at least one ethylenic unsaturation that can copolymerize with methyl methacrylate. Preferably, the comonomer is chosen from methyl acrylate and ethyl acrylate, and mixtures thereof.

The weight-average molecular mass of the (meth)acrylic polymer should be high, meaning more than 50 000 g/mol and preferably more than 100 000 g/mol.

The weight-average molecular mass may be measured by steric exclusion chromatography (SEC) or gel permeation chromatography (GPC).

The (meth)acrylic polymer is fully soluble in the (meth)acrylic monomer or in the mixture of (meth)acrylic monomers. It enables the viscosity of the (meth)acrylic monomer or the mixture of (meth)acrylic monomers to be increased. The solution obtained is generally called a "syrup" or "prepolymer". The dynamic viscosity value of the liquid (meth)acrylic syrup is between 10 mPa·s and 10 000 mPa·s, preferably between 50 mPa·s and 5000 mPa·s and advantageously between 100 mPa·s and 1000 mPa·s. The viscosity of the syrup can be readily measured with a rheometer or a viscometer. The dynamic viscosity is measured at 25° C. The liquid (meth)acrylic syrup has Newtonian behavior, meaning that there is no shear-thinning, so that the dynamic viscosity is independent of the shear in a rheometer or of the speed of the spindle in a viscometer. Such a viscosity of the syrup obtained allows correct impregnation of the fibers of the fibrous substrate.

Advantageously, the liquid (meth)acrylic syrup contains no additional voluntarily added solvent.

As regards the macromolecular blocks, they have a glass transition temperature of less than 0° C., written as Tg and measured by differential scanning calorimetry (DSC) according to standard ISO 11357-2.

Preferably, the macromolecular block of flexible nature forms part of a block copolymer containing at least one block with a glass transition temperature of less than 0° C.

The block copolymer may be chosen from a thermoplastic block copolymer. Advantageously, the block copolymer is amorphous. More advantageously, the block copolymer does not comprise any semicrystalline or crystalline blocks.

Most preferably, the thermoplastic block copolymer is a thermoplastic copolymer containing acrylic blocks. This means that at least 50% by weight of the monomers contained in the thermoplastic copolymer containing acrylic blocks are alkyl (meth)acrylate monomers.

The block copolymers may be obtained by controlled radical polymerization (CRP) or by anionic polymerization; the process that is the most appropriate, depending on the type of copolymer to be manufactured, will be chosen.

It will preferably be CRP, especially in the presence of nitroxides, for block copolymers of $(A)_nB$ type and anionic or nitroxide-based radical polymerization for structures of ABA type.

Furthermore, the number-average mass of the macromolecular blocks of flexible nature, with a glass transition temperature of less than 0° C., is greater than 10 000 g/mol, preferably greater than 30 000 g/mol, preferably greater than 60 000 g/mol and advantageously greater than 120 000 g/mol, but less than 500 000 g/mol. The polydispersity is between 1.5 and 2.5.

The macromolecular blocks are prepared from one or more monomers chosen from:
the acrylic monomers of formula

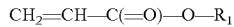

in which $R_1$ denotes a hydrogen atom or a linear, cyclic or branched $C_1$-$C_{40}$ alkyl group optionally substituted with a halogen atom or a hydroxyl, alkoxy, cyano, amino or epoxy group, for instance acrylic acid, methyl, ethyl, propyl, n-butyl, isobutyl, tert-butyl, 2-ethylhexyl or glycidyl acrylate, hydroxyalkyl acrylates or acrylonitrile;
the methacrylic monomers of formula

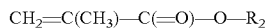

in which $R_2$ denotes a hydrogen atom or a linear, cyclic or branched $C_1$-$C_{40}$ alkyl group optionally substituted with a halogen atom or a hydroxyl, alkoxy, cyano, amino or epoxy group, for instance methacrylic acid, methyl, ethyl, propyl, n-butyl, isobutyl, tert-butyl, 2-ethylhexyl or glycidyl methacrylate, hydroxyalkyl methacrylates or methacrylonitrile;
vinylaromatic monomers, for instance styrene, substituted styrenes, alpha-methyl styrene, monochlorostyrene or tert-butylstyrene.

The macromolecular blocks are not prepared from a diene. A person skilled in the art knows how to combine these monomers so as to adjust the overall Tg of the macromolecular blocks. In order to obtain macromolecular blocks with a Tg of less than 0° C., it is necessary to use at least one monomer with a Tg of less than 0° C., for example butyl acrylate or 2-ethylhexyl acrylate.

The macromolecular blocks may be composed solely of a monomer with a Tg of less than 0° C., for example butyl acrylate or 2-ethylhexyl acrylate. The macromolecular blocks may also be composed of at least one alkyl acrylate and of a vinylaromatic monomer.

Preferably, the macromolecular blocks of flexible nature comprise butyl acrylate to at least 70% by mass.

Advantageously, the macromolecular blocks are composed of butyl acrylate and styrene in a butyl acrylate/styrene mass ratio of between 70/30 and 90/10, preferably between 75/25 and 85/15.

The macromolecular blocks are prepared by mixing with the monomer(s) intended to form the macromolecular blocks, an alkoxyamine of general formula $Z(-T)_n$ in which Z denotes a multivalent group, T a nitroxide and n is an integer greater than or equal to 2.

As regards the alkoxyamine, it is described by the general formula $Z(-T)_n$ in which Z denotes a multivalent group, T a nitroxide and n an integer greater than 2, preferably between 2 and 10 and advantageously between 2 and 8.

n represents the functionality of the alkoxyamine, i.e. the number of nitroxide radicals T that can be released by the alkoxyamine according to the mechanism:

This reaction is heat-activated. In the presence of monomer(s), the activated alkoxyamine initiates a polymerization. The scheme below illustrates the preparation of a copolymer polyM2-polyM1-polyM2 based on an alkoxyamine for which n=2. The monomer M1 is first polymerized after activation of the alkoxyamine, and, once the block polyM1 is complete, the monomer M2 is then polymerized:

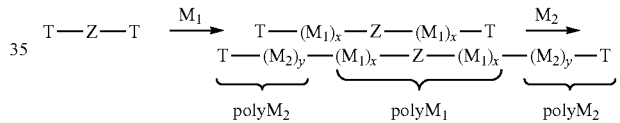

The principle of the preparation of block copolymers remains valid for n>2.

Z denotes a multivalent group, i.e. a group that can release after activation several radical sites. The activation in question takes place by cleavage of the covalent bond Z-T.

By way of example, Z may be chosen from groups (I) to (VIII) below:

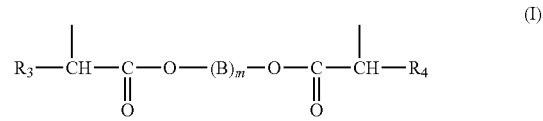

in which $R_3$ and $R_4$, which may be identical or different, represent a linear or branched alkyl radical containing a number of carbon atoms ranging from 1 to 10, phenyl or thienyl radicals optionally substituted with a halogen atom such as F, Cl or Br, or alternatively with a linear or branched alkyl radical containing a number of carbon atoms ranging from 1 to 4, or alternatively with nitro, alkoxy, aryloxy, carbonyl or carboxyl radicals; a benzyl radical, a cycloalkyl radical containing a number of carbon atoms ranging from 3 to 12, a radical comprising one or more unsaturations; B represents a linear or branched alkylene radical containing a number of carbon atoms ranging from 1 to 20; m is an integer ranging from 1 to 10;

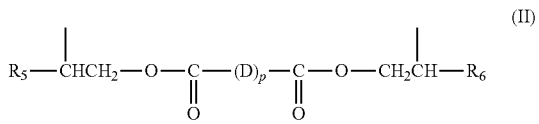
(II)

in which $R_5$ and $R_6$, which may be identical or different, represent aryl, pyridyl, furyl or thienyl radicals optionally substituted with a halogen atom such as F, Cl or Br, or alternatively with a linear or branched alkyl radical containing a number of carbon atoms ranging from 1 to 4, or alternatively with nitro, alkoxy, aryloxy, carbonyl or carboxyl radicals; D represents a linear or branched alkylene radical containing a number of carbon atoms ranging from 1 to 6, a phenylene radical or a cycloalkylene radical; p is an integer ranging from 1 to 10;

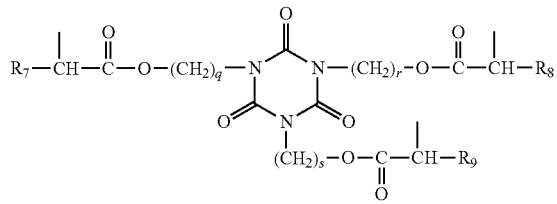
(III)

in which $R_7$, $R_8$ and $R_9$, which may be identical or different, have the same meanings as $R_3$ and $R_4$ of formula (I), q, r and s are integers ranging from 1 to 10;

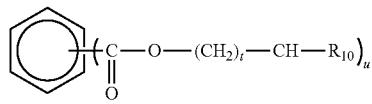
(IV)

in which $R_{10}$ has the same meaning as $R_5$ and $R_6$ of formula (II), t is an integer ranging from 1 to 4, u is an integer between 2 and 6 (the aromatic group is substituted);

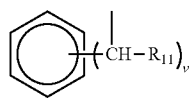
(V)

in which $R_{11}$ has the same meaning as the radical $R_{10}$ of formula (IV) and v is an integer between 2 and 6;

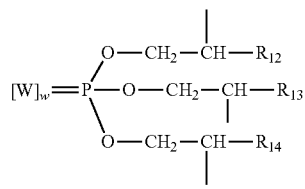
(VI)

in which $R_{12}$, $R_{13}$ and $R_{14}$, which may be identical or different, represent a phenyl radical, optionally substituted with a halogen atom such as Cl or Br, or alternatively with a linear or branched alkyl radical, containing a number of carbon atoms ranging from 1 to 10; W represents an oxygen, sulfur or selenium atom, w is equal to 0 or 1;

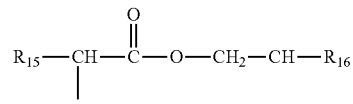
(VII)

in which $R_{15}$ has the same meaning as $R_3$ of formula (I), $R_{16}$ has the same meaning as $R_5$ or $R_6$ of formula (II);

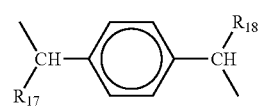
(VIII)

in which $R_{17}$ and $R_{18}$, which may be identical or different, represent a hydrogen atom or a linear or branched alkyl radical containing a number of carbon atoms ranging from 1 to 10, an aryl radical, optionally substituted with a halogen atom or a heteroatom.

T denotes a nitroxide, which is a stable free radical bearing a group =N—O., i.e. a group on which an unpaired electron is present. The term "stable free radical" denotes a radical that is so persistent and unreactive toward atmospheric air and moisture that it can be handled and stored for a much longer time than the majority of free radicals (see in this respect *Accounts of Chemical Research* 1976, 9, 13-19). The stable free radical thus differs from free radicals whose lifetime is fleeting (from a few milliseconds to a few seconds) such as free radicals derived from the usual polymerization initiators, for instance peroxides, hydroperoxides or azo initiators. Polymerization-initiating free radicals tend to accelerate the polymerization, whereas stable free radicals generally tend to slow it down. A free radical may be said to be stable within the meaning of the present invention if it is not a polymerization initiator and if, under the usual conditions of the invention, the average lifetime of the radical is at least one minute.

T is represented by the structure:

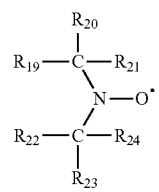
(IX)

in which $R_{19}$, $R_{20}$, $R_{21}$, $R_{22}$, $R_{23}$ and $R_{24}$ denote groups from among:
  linear or branched $C_1$-$C_{20}$ and preferably $C_1$-$C_{10}$ alkyls such as substituted or unsubstituted methyl, ethyl, propyl, butyl, isopropyl, isobutyl, tert-butyl or neopentyl,
  substituted or unsubstituted $C_6$-$C_{30}$ aryls such as benzyl, aryl(phenyl),
  saturated $C_1$-$C_{30}$ cyclics, and in which the groups $R_{19}$ and $R_{22}$ may form part of an optionally substituted cyclic structure $R_{19}$—CNC—$R_{22}$ which may be chosen from:

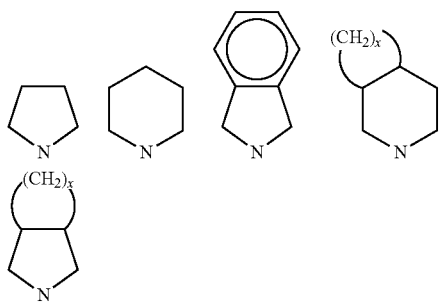

in which x denotes an integer between 1 and 12.

By way of example, use may be made of the following nitroxides:

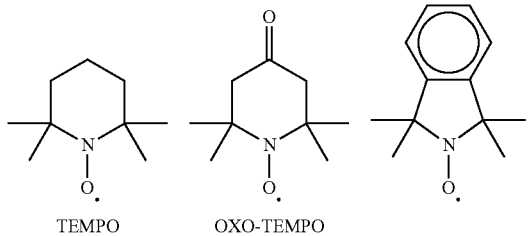

TEMPO          OXO-TEMPO

The nitroxides of formula (X) are particularly preferably used in the context of the invention:

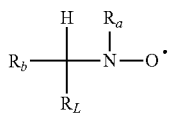

(X)

$R_a$ and $R_b$ denoting identical or different alkyl groups bearing from 1 to 40 carbon atoms, optionally linked together so as to form a ring and optionally substituted with hydroxyl, alkoxy or amino groups, $R_L$ denoting a monovalent group with a molar mass of greater than 16 g/mol and preferably greater than 30 g/mol. The group $R_L$ may have, for example, a molar mass of between 40 and 450 g/mol. It is preferably a phosphorus-bearing group of general formula (XI):

(XI)

in which X and Y, which may be identical or different, may be chosen from alkyl, cycloalkyl, alkoxyl, aryloxyl, aryl, aralkyloxyl, perfluoroalkyl and aralkyl radicals, and may comprise from 1 to 20 carbon atoms; X and/or Y may also be a halogen atom such as a chlorine, bromine or fluorine atom.

Advantageously, $R_L$ is a phosphonate group of formula:

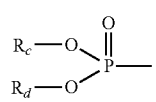

(XII)

in which $R_c$ and $R_d$ are identical or different alkyl groups, optionally linked so as to form a ring, comprising from 1 to 40 optionally substituted or unsubstituted carbon atoms.

The group $R_L$ may also comprise at least one aromatic ring such as the phenyl radical or the naphthyl radical, which is substituted, for example, with one or more alkyl radicals comprising from 1 to 10 carbon atoms.

The nitroxides of formula (X) are preferred since they make it possible to obtain good control of the radical polymerization of the (meth)acrylic monomers. The alkoxyamines of formula (XIII) bearing a nitroxide of formula (X) are thus preferred:

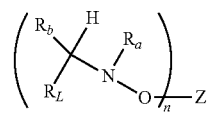

(XIII)

in which:

Z denotes a multivalent group, and n is an integer greater than or equal to 1;

$R_a$ and $R_b$ denote identical or different alkyl groups bearing from 1 to 40 carbon atoms, optionally linked together so as to form a ring and optionally substituted with hydroxyl, alkoxy or amino groups;

$R_L$ denotes a monovalent group with a molar mass of greater than 16 g/mol and preferably greater than 30 g/mol. The group $R_L$ may have, for example, a molar mass of between 40 and 450 g/mol. It is preferably a phosphorus-bearing group of general formula (XIV):

(XIV)

in which X and Y, which may be identical or different, may be chosen from alkyl, cycloalkyl, alkoxyl, aryloxyl, aryl, aralkyloxyl, perfluoroalkyl and aralkyl radicals, and may comprise from 1 to 20 carbon atoms; X and/or Y may also be a halogen atom such as a chlorine, bromine or fluorine atom.

Advantageously, $R_L$ is a phosphonate group of formula (XV):

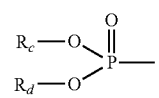

(XV)

in which $R_c$ and $R_d$ are identical or different alkyl groups, optionally linked so as to form a ring, comprising from 1 to 40 optionally substituted or unsubstituted carbon atoms.

The group $R_L$ may also comprise at least one aromatic ring such as the phenyl radical or the naphthyl radical, which is substituted, for example, with one or more alkyl radicals comprising from 1 to 10 carbon atoms.

By way of example of nitroxide of formula (X) that may be borne by the alkoxyamine (XIII), mention may be made of:
N-tert-butyl-1-phenyl-2-methylpropyl nitroxide,
N-(2-hydroxymethylpropyl)-1-phenyl-2-methylpropyl nitroxide,
N-tert-butyl-1-dibenzylphosphono-2,2-dimethylpropyl nitroxide,
N-tert-butyl-1-di(2,2,2-trifluoroethyl)phosphono-2,2-dimethylpropyl nitroxide,
N-tert-butyl[(1-diethylphosphono)-2-methylpropyl]nitroxide,
N-(1-methylethyl)-1-cyclohexyl-1-(diethylphosphono) nitroxide,
N-(1-phenylbenzyl)-[(1-diethylphosphono)-1-methylethyl] nitroxide,
N-phenyl-1-diethylphosphono-2,2-dimethylpropyl nitroxide,
N-phenyl-1-diethylphosphono-1-methylethyl nitroxide,
N-(1-phenyl-2-methylpropyl)-1-diethylphosphonomethylethyl nitroxide,
or alternatively the nitroxide of formula:

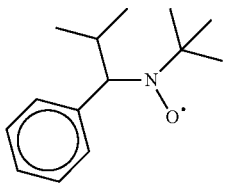

The nitroxide of formula (XVI) is particularly preferred:

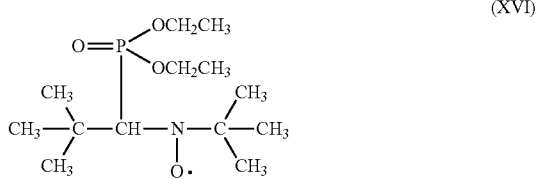
(XVI)

It is N-tert-butyl-1-diethylphosphono-2,2-dimethylpropyl nitroxide, commonly known for simplicity as SG1.

The alkoxyamine (1), and especially the alkoxyamine (XIII), may be prepared via recipes described, for example, in U.S. Pat. No. 5,910,549 or in FR 99/04405. One method that may be used consists in coupling a carbon-based radical with a nitroxide. The coupling may be performed starting with a halogenated derivative in the presence of an organometallic system such as CuX/ligand (X=Cl or Br) according to a reaction of ATRA type (atom-transfer radical addition) as described by D. Greszta et al. in *Macromolecules* 1996, 29, 7661-7670.

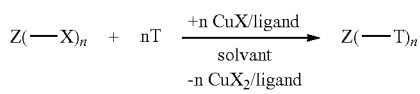

The alkoxyamines that may be used in the context of the invention are represented below:

DIAMINS:

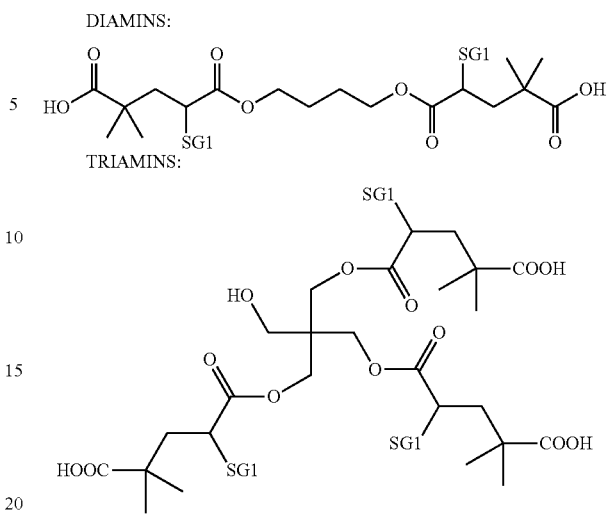

DIAMINS is preferably used.

It would not constitute a departure from the context of the present invention to combine several alkoxyamines corresponding to formula (I), in particular several alkoxyamines of formula (XIII). These mixtures might thus comprise, for example, an alkoxyamine containing n1 attached nitroxides and an alkoxyamine containing n2 attached nitroxides with n1 different from n2. It might also be a combination of alkoxyamines bearing different nitroxides.

In order to conserve a dynamic viscosity of the (meth) acrylic syrup of between 10 mPa·s and 10 000 mPa·s, preferably between 50 mPa·s and 5 000 mPa·s and advantageously between 100 mPa·s and 1000 mPa·s, such that it allows good impregnation of the fibrous substrate, the various compounds of the (meth)acrylic syrup are incorporated with the following mass percentages:

The (meth)acrylic monomer(s) in the liquid (meth)acrylic syrup are present in a proportion of at least 30% by weight, preferably at least 40% by weight, advantageously at least 50% by weight and more advantageously at least 70% by weight of the total liquid (meth)acrylic syrup.

The (meth)acrylic polymer(s) in the liquid (meth)acrylic syrup are present in a proportion of at least 1% by weight, preferably 5%, advantageously at least 8% and more advantageously at least 10% by weight of the total liquid (meth) acrylic syrup.

The (meth)acrylic polymer(s) in the liquid (meth)acrylic syrup are present in a proportion of not more than 50% by weight, preferably not more than 40%, advantageously not more than 35% and more advantageously not more than 30% by weight of the total liquid (meth)acrylic syrup.

In particular, the liquid (meth)acrylic impregnation syrup comprises:
a) from 10% by weight to 30% by weight of a (meth) acrylic polymer,
b) from 30% by weight to 89% by weight of a (meth) acrylic monomer,
c) from 1% by weight to 40% by weight of macromolecular blocks.

As regards the process for manufacturing the (meth) acrylic impregnation syrup, it comprises the following steps:

During the first step, macromolecular blocks are prepared by mixing the alkoxyamine $Z(-T)_n$ and the monomer(s) intended to form the macromolecular blocks and by heating the mixture obtained to a temperature sufficient to activate the alkoxyamine.

It is possible also to add nitroxide to the mixture so as to ensure better control of the polymerization. The further nitroxide that is added may be identical to that which is borne on the alkoxyamine or different. The molar proportion of nitroxide added relative to the alkoxyamine is between 0 and 20% and preferably between 0 and 10%.

The conversion may range between 10% and 100%. However, preferably, the polymerization is stopped for a conversion of between 50% and 100% and advantageously between 50% and 80%.

This step may be performed in a closed reactor or in an open reactor, for example a piston-type reactor. Preferably, it is a closed reactor. The macromolecular blocks are prepared at a temperature of between 80 and 150° C., preferably between 80 and 130° C. This temperature is linked to the alkoxyamine and to the monomer(s) used. The polymerization time may range between 30 minutes and 8 hours, preferably between 1 and 8 hours, advantageously between 2 and 6 hours. It is preferable to avoid the presence of oxygen. To do this, the reaction mixture is generally degassed under reduced pressure and the reactor made inert by flushing with nitrogen or argon after introduction of the reagents.

After this first step, the macromolecular blocks are obtained, optionally mixed with the unconsumed monomer(s). The latter monomer(s) may be removed by distillation under reduced pressure at a temperature below 80° C.

During the second step, the macromolecular blocks obtained after the first step are mixed with the (meth)acrylic monomer and the (meth)acrylic polymer, so as to obtain the (meth)acrylic impregnation syrup.

The macromolecular blocks are soluble in the (meth) acrylic monomer to form a solution, or homogeneous mixture. They are linear chains with a glass transition temperature Tg of less than 0° C., and therefore do not disrupt the viscosity of the (meth)acrylic syrup.

Since the macromolecular blocks are very soluble and do not disrupt the viscosity of the syrup, it is possible to incorporate them into the syrup in a high content, typically between 5% by weight and 40% by weight. Such a content of macromolecular blocks makes it possible to obtain, after polymerization of the syrup, a polymer matrix with very good impact strength.

As regards the process for impregnating the fibrous substrate, it comprises a step of impregnating the fibrous substrate with the liquid (meth)acrylic syrup obtained at the end of step 2. This impregnation step takes place in a closed mold.

If the viscosity of the liquid (meth)acrylic syrup at a given temperature is slightly too high for the impregnation process, it is possible to heat the syrup so as to have a more liquid syrup for sufficient wetting and correct and complete impregnation of the fibrous substrate.

As regards the fibrous substrate, mention may be made of fabrics, felts or nonwovens that may be in the form of strips, laps, braids, locks or pieces. The fibrous material may have various forms and dimensions, either one-dimensional, two-dimensional or three-dimensional. A fibrous substrate comprises an assembly of one or more fibers. When the fibers are continuous, their assembly forms fabrics.

The one-dimensional form corresponds to linear long fibers. The fibers may be discontinuous or continuous. The fibers may be arranged randomly or parallel to each other, in the form of a continuous filament. A fiber is defined by its aspect ratio, which is the ratio between length and diameter of the fiber. The fibers used in the present invention are long fibers or continuous fibers. The fibers have an aspect ratio of at least 1000, preferably at least 1500, more preferably at least 2000, advantageously at least 3000 and more advantageously at least 5000, even more advantageously at least 6000, more advantageously still at least 7500 and most advantageously at least 10 000.

The two-dimensional form corresponds to nonwoven or woven fibrous mats or reinforcements or bundles of fibers, which may also be braided. Even if the two-dimensional form has a certain thickness and consequently in principle a third dimension, it is considered as two-dimensional according to the present invention.

The three-dimensional form corresponds, for example, to nonwoven fibrous mats or reinforcements or stacked or folded bundles of fibers or mixtures thereof, an assembly of the two-dimensional form in the third dimension.

The origins of the fibrous material may be natural or synthetic. As natural material one can mention plant fibers, wood fibers, animal fibers or mineral fibers.

Natural fibers are, for example, sisal, jute, hemp, flax, cotton, coconut fibers, and banana fibers. Animal fibers are, for example, wool or hair.

As synthetic material, mention may be made of polymeric fibers chosen from fibers of thermosetting polymers, of thermoplastic polymers or mixtures thereof.

The polymeric fibers may consist of polyamide (aliphatic or aromatic), polyester, polyvinyl alcohol, polyolefins, polyurethanes, polyvinyl chloride, polyethylene, unsaturated polyesters, epoxy resins and vinyl esters.

The mineral fibers may also be chosen from glass fibers, especially of E, R or S2 type, carbon fibers, boron fibers or silica fibers.

The fibrous substrate of the present invention is chosen from plant fibers, wood fibers, animal fibers, mineral fibers, synthetic polymeric fibers, glass fibers and carbon fibers, and mixtures thereof. Preferably, the fibrous substrate is chosen from mineral fibers.

The fibers of the fibrous substrate have a diameter between 0.005 µm and 100 µm, preferably between 1 µm and 50 µm, more preferably between 5 µm and 30 µm and advantageously between 10 µm and 25 µm.

Preferably, the fibers of the fibrous substrate of the present invention are chosen from continuous fibers (meaning that the aspect ratio does not necessarily apply as for long fibers) for the one-dimensional form, or long or continuous fibers for the two-dimensional or three-dimensional form of the fibrous substrate.

According to an additional aspect, the invention relates to a polymeric composite material comprising a thermoplastic (meth)acrylic matrix and a fibrous substrate used as reinforcement, in which the fibrous substrate consists of long fibers, said composite material being characterized in that the thermoplastic (meth)acrylic matrix is obtained after polymerization of said fibrous substrate preimpregnated with said liquid (meth)acrylic syrup.

Another aspect of the present invention is a process for manufacturing composite parts, comprising the following steps:

a) impregnating a fibrous substrate with the liquid (meth) acrylic syrup, b) polymerizing the liquid (meth)acrylic syrup impregnating said fibrous substrate.

The impregnation of the fibrous substrate in step a) is preferably performed in a closed mold.

Advantageously, step a) and step b) are performed in the same closed mold.

At the time of polymerization of the (meth)acrylic syrup, the macromolecules generate a copolymer bearing B(-A)n blocks. This copolymer consists of a block B formed by the macromolecules and of n arms A, n being an integer greater than 2, preferably between 2 and 10 and advantageously between 2 and 8. The arms A are formed by the (meth) acrylic polymer PMMA undergoing formation during the polymerization of the syrup. In the context of the invention, it may be a triblock copolymer with, in this case, n=2 (a central block and two arms). As examples of triblock copolymers, they may be:

PMMA-b-poly-n-butyl acrylate-b-PMMA
PMMA-b-poly(n-butyl acrylate-co-styrene)-b-PMMA
PMMA-b-poly(isobutyl acrylate-co-styrene)-b-PMMA b being the symbol used to denote a block copolymer and co being the symbol used to denote a statistical copolymer.

After the polymerization, a mechanical part or a structural element made of nanostructured composite material is then obtained, the thermoplastic matrix of which is reinforced against impacts and has very good impact strength.

As regards the process for manufacturing the composite parts, various processes could be used for preparing mechanical parts. Mention may be made of infusion, vacuum bag molding, pressure bag molding, autoclave molding, resin transfer molding (RTM), reaction injection molding (RIM), reinforced reaction injection molding (R-RIM) and variants thereof, press molding or compression molding.

The preferred manufacturing processes for manufacturing composite parts are processes according to which the liquid (meth)acrylic syrup is transferred to the fibrous substrate by impregnation of the fibrous substrate in a mold, more preferably in a closed mold.

Advantageously, the step of impregnating the fibrous material is performed in a closed mold.

Most advantageously, the process for manufacturing composite parts is chosen from resin transfer molding and infusion.

All the processes comprise the step of impregnating the fibrous substrate with the liquid (meth)acrylic syrup before the step of polymerization in a mold.

The step of polymerization of the liquid (meth)acrylic syrup impregnating said fibrous substrate takes place after the step of impregnation in the same mold.

Resin transfer molding is a process using a two-sided mold set which forms both surfaces of a composite material. The lower side is a rigid mold. The upper side may be a rigid or flexible mold. Flexible molds can be made from composite materials, silicone or extruded polymer films such as nylon. The two sides fit together to form a mold cavity. The distinguishing feature of resin transfer molding is that the fibrous substrate is placed into this cavity and the mold set is closed prior to the introduction of the liquid (meth)acrylic syrup. Resin transfer molding includes numerous varieties which differ in the mechanics of introduction of the liquid (meth)acrylic syrup into the fibrous substrate in the mold cavity. These variations range from vacuum infusion to vacuum assisted resin transfer molding (VARTM). This process may be performed at room or elevated temperature.

With the infusion process, the liquid (meth)acrylic syrup must have the appropriate viscosity for this process for preparing the polymeric composite material. The liquid (meth)acrylic syrup is sucked into the fibrous substrate, which is in a special mold, by applying a gentle vacuum.

The fibrous substrate is infused and completely impregnated by the liquid (meth)acrylic syrup.

One advantage of this process is the large amount of fibrous material in the composite.

As regards the use of the composite parts thus manufactured, mention may be made of automotive applications, nautical applications, railroad applications, sport, aeronautic and aerospace applications, photovoltaic applications, computer related applications, telecommunication applications and wind energy applications.

The composite part is especially a motor vehicle part, boat part, train part, sport article, plane or helicopter part, space ship or rocket part, photovoltaic module part, wind turbine part, furniture part, construction or building part, telephone or cellphone part, computer or television part, printer or photocopier part.

As regards the recycling of the thermoplastic composite part, it may be performed by grinding or depolymerization of the thermoplastic polymer.

Grinding is performed mechanically in order to obtain smaller pieces of the part. As the part comprises a thermoplastic polymer, this polymer can be heated, and the pieces once again transformed within a certain limit in order to obtain a recycled object.

Preferably, the thermoplastic composite part is heated to perform pyrolysis or thermal decomposition of the PMMA and to recover methyl methacrylate as monomer.

Advantageously, at least 50% by weight of the MMA present in the polymer is recovered by thermal decomposition.

The part is brought to a temperature of at least 200° C. and less than or equal to 400° C.

A final subject of the present invention thus relates to the use of the impregnation process or of the manufacturing process according to the invention, especially when said methacrylic polymer is a homopolymer and/or a copolymer of methyl methacrylate, for the manufacture of mechanical and/or structural parts which are recyclable by thermal depolymerization (via pyrolysis), at least 50% of the monomers, especially methyl methacrylate (MMA), preferably being recovered.

EXAMPLES

Example 1

First Step—Preparation of the Impact Additive: Preparation of Macromolecular Blocks Based on Butyl Acrylate and Styrene.

The following are introduced into a 2-liter metal reactor equipped with an impeller stirrer, a jacket for heating by circulation of oil and a vacuum/nitrogen inlet:

616 g of butyl acrylate
84 g of styrene
2.4 g of DIAMIS dialkoxyamine (94% pure and 0.35% free SG1), i.e. 2.3 g of pure DIAMS
0.09 g of 85% pure SG1 (i.e. 0.077 g of pure SG1), which represents a 5 mol % excess per alkoxy function borne by the DIAMIS taking into account the 0.35% of free SG1 already present in the DIAMIS.

After introduction of the reagents, the reaction mixture is degassed via three vacuum/nitrogen flushes. The reactor is then closed and the stirring (50 rpm) and heating (nominal temperature: 125° C.) are subsequently started. The temperature of the reaction mixture reaches 113° C. in about 30 minutes. The pressure stabilizes at about 1.5 bar. The reactor temperature is maintained at a stage of 115° C. for 522 minutes. After cooling, 608 g of a mixture with a solids content of 67% are recovered. The excess butyl acrylate is then removed by evaporation at 70° C. under reduced pressure for 3 hours and replaced with 700 g of methyl methacrylate MMA. 1110 g of a solution at 37% in the MMA of a "stripped" macro radical (freed of its excess butyl acrylate) are thus recovered. The butyl acrylate/styrene weight ratio of the macro radical obtained is 83/17. Analysis by GPC of the macromolecular blocks gives the following results: $M_n$: 120 000 g/mol; $M_w$: 252 000 g/mol; polydispersity: 2.1.

Step 2: Preparation of an Impregnation Syrup

A syrup is prepared by dissolving 22% by weight of the PMMA (BS520 from the company Altuglas International, a copolymer of MMA comprising ethyl acrylate as comonomer) in 88% by weight of methyl methacrylate, which is stabilized with MEHQ (hydroquinone monoethyl ether). 8% by weight of macromolecular blocks prepared beforehand in step 1 is incorporated into this syrup. The syrup has a dynamic viscosity of 325 mPa·s, measured at room temperature (25° C.) with a cone/plate rheometer from the company Brookfield. The syrup is injected into a closed mold comprising a glass cloth as fibrous substrate.

Step 3: Production of a Composite Part

Eight glass cloths (glass E, HexForce® 01717 820 TF970 cloth armoring from the company Hexcel, with a nominal weight of 160 g/m$^2$) measuring 30 cm×20 cm were folded on a glass plate serving as mold to obtain a composite part 2 mm thick.

The impregnation syrup prepared beforehand was infused by means of a vacuum pump for transferring syrup through the cloth. The sheet was impregnated by infusion for 3 minutes, the infusion progressing at 100 mm/minute. The sheet impregnated by infusion was placed in an oven for 8 hours at 71° C. and an additional heating step of 30 minutes at 125° C. took place to terminate the polymerization of the PMMA (achieving a degree of monomer conversion of virtually 100%).

The polymer composite was recovered by separation of the various films of the infusion after complete polymerization and mold release.

A composite part in plate form is obtained from the mold.

The plate shows good adhesion of the thermoplastic polymer to the fibrous substrate.

After use, the composite part in sheet form can be recycled by heating and depolymerization.

Example 2 (Outside the Invention)

First Step: Preparation of an Impregnation Syrup

A syrup was prepared by dissolving 25% by weight of polymethyl methacrylate (PMMA V825 from the company Altuglas) in methyl methacrylate (MMa) in the presence of 325 ppm of AIBN (azobisisobutyronitrile) and 35 ppm of terpinolene (1,4-para-menthadiene). Dissolution took place at room temperature at 25° C. for 48 hours. The viscosity of the syrup solution was 513 mPa·s, measured at room temperature (25° C.) with a cone/plate rheometer from the company Brookfield.

Second Step: Production of a Composite Part

Eight glass cloths (glass E, HexForce® 01717 820 TF970 cloth armoring from the company Hexcel, with a nominal weight of 160 g/m$^2$) measuring 30 cm×20 cm were folded on a glass plate serving as mold to obtain a composite part 2 mm thick.

The prepolymer syrup formed was infused by means of a vacuum pump for transferring the syrup through the cloth. The sheet was impregnated by infusion for 3 minutes, the infusion progressing at 100 mm/minute. The sheet impregnated by infusion was placed in an oven for 4 hours at 60° C. and an additional heating step of 30 minutes at 125° C.

took place to terminate the polymerization of the PMMA (achieving a degree of monomer conversion of virtually 100%).

The polymer composite was recovered by separation of the various films of the infusion after complete polymerization and mold release.

Comparative Tests: Impact Characterization of the Composite Plates Prepared in Examples 1 and 2: Rapid Flexure Test The multilayer structure, supported as a brace, is subjected to flexure, at the center of the span, at a constant speed. During this test, the load applied to the specimen is measured.

FIG. 1 is a scheme of the flexure tests performed. The flexure tests are performed at a constant speed on the MTS-831 servo-hydraulic machine. The force F is measured using a piezoelectric cell buried in the nose of the 569.4 N range striker P. The movement of the specimen E during the stress is measured by an L.V.D.T. sensor on the 50 mm range hydraulic jack.

Preparation of the Specimens

Bars corresponding to the dimensions below are sampled using a digital Charlyrobot CRA brand molding machine from compressed plates simulating the multilayer structures.

The choice of the sampling plate is made visually according to the surface state of the thin layer. 6 bars are cut out per plate.

The specimen E dimensions, in millimeters, are:
length: l=80±0.2
width: b=10.0±0.2
thickness: h=measured for each bar Flat position according to the definition of standard ISO 179

Test Conditions

The span L, distance between the bearings on the support S, is set at L=62 mm.

The stress speed applied is 1 m/s.

During the test, the force F (expressed in N) and the displacement (mm) of the striker are recorded.

From the experimental curves, the area under the Force curve as a function of the displacement up to the point of rupture of the specimen is calculated. This area is expressed in joules and is representative of the energy supplied to the system during loading.

The flexural strength, noted as Re, is the rupture energy relative to the central straight section of the bar expressed in kJ/m$^2$.

Example 1 according to the invention Re=30.7±4.6 kJ/m$^2$
Example 2 outside the invention Re=18.9±7.1 kJ/m$^2$

The invention claimed is:

1. A liquid (meth)acrylic syrup for impregnating a fibrous substrate, said fibrous substrate consisting of long fibers, having a diameter between 0.005 micrometers and 100 micrometers, and an aspect ratio of 1000 or greater, said syrup comprising:
   a) a (meth)acrylic polymer,
   b) a (meth)acrylic monomer,
   c) elastomeric domains consisting of macromolecular blocks of flexible nature, that are part of a block copolymer, wherein said macromolecular blocks are not prepared from a diene, and wherein said elastomeric macromolecular blocks are between 5% and 15% by weight, with a glass transition temperature of less than 0° C., and which are soluble in the (meth)acrylic monomer, said liquid (meth)acrylic syrup having a dynamic viscosity of between 10 mPa·s and 10 000 mPa·s.

2. The liquid (meth)acrylic impregnation syrup as claimed in claim 1, wherein the macromolecular blocks are prepared from monomers chosen from:
the acrylic monomers of formula $CH_2=CH-C(=O)-O-R_1$ in which $R_1$ denotes a hydrogen atom or a linear, cyclic or branched $C_1$-$C_{40}$ alkyl group optionally substituted with a halogen atom or a hydroxyl, alkoxy, cyano, amino or epoxy group,
the methacrylic monomers of formula $CH_2=C(CH_3)-C(=O)-O-R_2$ in which $R_2$ denotes a hydrogen atom or a linear, cyclic or branched $C_1$-$C_{40}$ alkyl group optionally substituted with a halogen atom or a hydroxyl, alkoxy, cyano, amino or epoxy group, and vinylaromatic monomers.

3. The liquid (meth)acrylic impregnation syrup as claimed in claim 1, wherein the macromolecular blocks of flexible nature comprise butyl acrylate to at least 70% by mass.

4. The liquid (meth)acrylic impregnation syrup as claimed in claim 1, wherein the macromolecular blocks are prepared from butyl acrylate and styrene in a butyl acrylate/styrene mass ratio of between 70/30 and 90/10.

5. The liquid (meth)acrylic impregnation syrup as claimed in claim 1, wherein the block copolymers are obtained by controlled radical polymerization (CRP) or by anionic polymerization.

6. The liquid (meth)acrylic impregnation syrup as claimed in claim 1, wherein the macromolecular blocks are prepared by mixing with the monomer(s) intended to form the macromolecular blocks, an alkoxyamine of general formula $Z(-T)_n$ in which Z denotes a multivalent group, T a nitroxide and n is an integer greater than or equal to 2.

7. The liquid (meth)acrylic impregnation syrup as claimed in claim 6, wherein the alkoxyamine corresponds to the following formula:

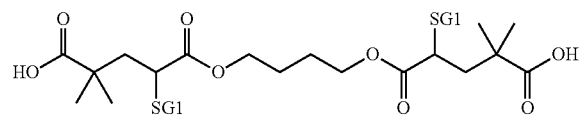

SG1 being N-tert-butyl-1-diethylphosphono-2,2-dimethylpropyl nitroxide.

8. The liquid (meth)acrylic impregnation syrup as claimed in claim 6, wherein the alkoxyamine corresponds to the following formula:

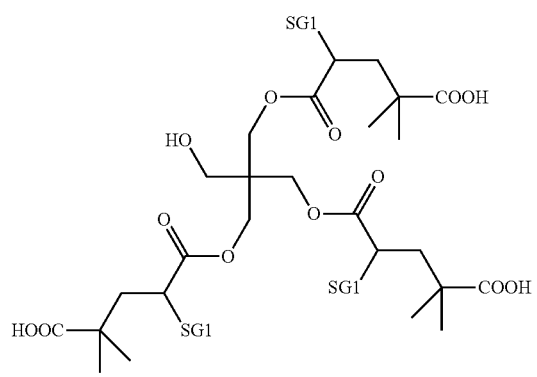

SG1 being N-tert-butyl-1-diethylphosphono-2,2-dimethylpropyl nitroxide.

9. The liquid (meth)acrylic impregnation syrup as claimed in claim 1, wherein the (meth)acrylic polymer is a homo- or copolymer of methyl methacrylate (MMA) or a mixture thereof.

10. The liquid (meth)acrylic impregnation syrup as claimed in claim 9, wherein the copolymer of methyl methacrylate (MMA) comprises at least 70% by weight of methyl methacrylate (MMA).

11. The liquid (meth)acrylic impregnation syrup as claimed claim 9, wherein the copolymer of methyl methacrylate (MMA) comprises from 70% to 99.7% by weight of methyl methacrylate and from 0.3 to 30% by weight of at least one monomer bearing at least one ethylenic unsaturation that can copolymerize with methyl methacrylate.

12. The liquid (meth)acrylic syrup as claimed in claim 9, wherein the (meth)acrylic polymer comprises comonomer units, said comonomer being an alkyl acrylate containing an alkyl group of 1 to 12 carbon atoms.

13. The liquid (meth)acrylic syrup as claimed in claim 12, wherein the comonomer is chosen from methyl acrylate and ethyl acrylate, and a mixture thereof.

14. The liquid (meth)acrylic syrup as claimed in claim 1, wherein the (meth)acrylic monomer is chosen from acrylic acid, methacrylic acid, alkyl acrylic monomers and alkyl methacrylic monomers, and mixtures thereof, the alkyl group containing from 1 to 22 linear, branched or cyclic carbons.

15. The liquid (meth)acrylic syrup as claimed in claim 14, wherein the (meth)acrylic monomer is chosen from methyl methacrylate, ethyl methacrylate, methyl acrylate, ethyl acrylate, methacrylic acid, acrylic acid, n-butyl acrylate, isobutyl acrylate, n-butyl methacrylate, isobutyl methacrylate, cyclohexyl acrylate, cyclohexyl methacrylate, isobornyl acrylate and isobornyl methacrylate, and mixtures thereof.

16. The liquid (meth)acrylic syrup as claimed in claim 14, wherein the (meth)acrylic monomer is chosen from methyl methacrylate, isobornyl acrylate and acrylic acid, and mixtures thereof.

17. The liquid (meth)acrylic syrup as claimed in claim 14 wherein 50% by weight or more of the (meth)acrylic monomer is methyl methacrylate.

18. The liquid (meth)acrylic impregnation syrup as claimed in claim 1 wherein the (meth)acrylic polymer in the liquid (meth)acrylic syrup is present in a content of at least 1% by weight of the total liquid (meth)acrylic syrup.

19. The liquid (meth)acrylic impregnation syrup as claimed in claim 1, wherein the (meth)acrylic polymer in the liquid (meth)acrylic syrup is present in a content of not more than 50% by weight of the total liquid (meth)acrylic syrup.

20. The liquid (meth)acrylic impregnation syrup as claimed in claim 1, wherein the (meth)acrylic monomer in the liquid (meth)acrylic syrup is present in a content of at least 30% by weight of the total liquid (meth)acrylic syrup.

21. The liquid (meth)acrylic impregnation syrup as claimed in claim 1, wherein said syrup comprises:
a) from 10% by weight to 30% by weight of a (meth)acrylic polymer,
b) from 30% by weight to 89% by weight of a (meth)acrylic monomer,
c) from 5% by weight to 15% by weight of macromolecular blocks.

22. A process for manufacturing a liquid (meth)acrylic impregnation syrup as claimed in claim 1, wherein said process it comprises the following steps:
1. preparing macromolecular blocks by mixing with the monomer(s), intended to form the macromolecular blocks, an alkoxyamine of general formula $Z(\text{-}T)_n$ in which Z denotes a multivalent group, T a nitroxide and n is an integer greater than or equal to 2, 2. mixing the macromolecular blocks obtained in step 1 with a (meth)acrylic polymer and a (meth)acrylic monomer.

23. An impregnation process for impregnating a fibrous substrate, said fibrous substrate consisting of long fibers and said process comprising a step of impregnating said fibrous substrate with said (meth)acrylic syrup as claimed in claim 1.

24. The impregnation process as claimed in claim 23, wherein the step of impregnating said fibrous substrate is performed in a closed mold.

25. A polymeric composite material comprising a thermoplastic (meth)acrylic matrix and a fibrous substrate used as reinforcement, in which the fibrous substrate consists of long fibers, said composite material being characterized in that the thermoplastic (meth)acrylic matrix is obtained after polymerization of said fibrous substrate preimpregnated with said liquid (meth)acrylic syrup as claimed in claim 1.

26. A process for manufacturing composite parts, comprising the following steps:
 a) impregnating a fibrous substrate with a liquid (meth) acrylic syrup as claimed in claim 1,
 b) polymerizing said liquid (meth)acrylic syrup impregnating said fibrous substrate.

27. The process as claimed in claim 26, wherein the impregnation of the fibrous substrate in step a) is performed in a closed mold.

28. The process as claimed in claim 26, wherein step a) and step b) are performed in the same closed mold.

29. The process as claimed in claim 26, wherein the process is chosen from resin transfer molding and infusion.

30. A mechanical part or structural element made of composite material as claimed in claim 25.

31. The part as claimed in claim 30, said part being a motor vehicle part, boat part, train part, sport article, plane or helicopter part, space ship or rocket part, photovoltaic module part, wind turbine part, furniture part, construction or building part, telephone or cellphone part, computer or television part, printer or photocopier part.

* * * * *